Feb. 26, 1929.
J. T. D'ALBAY
1,703,264
FRICTION SHOCK ABSORBER
Filed Oct. 25, 1926  2 Sheets-Sheet 1
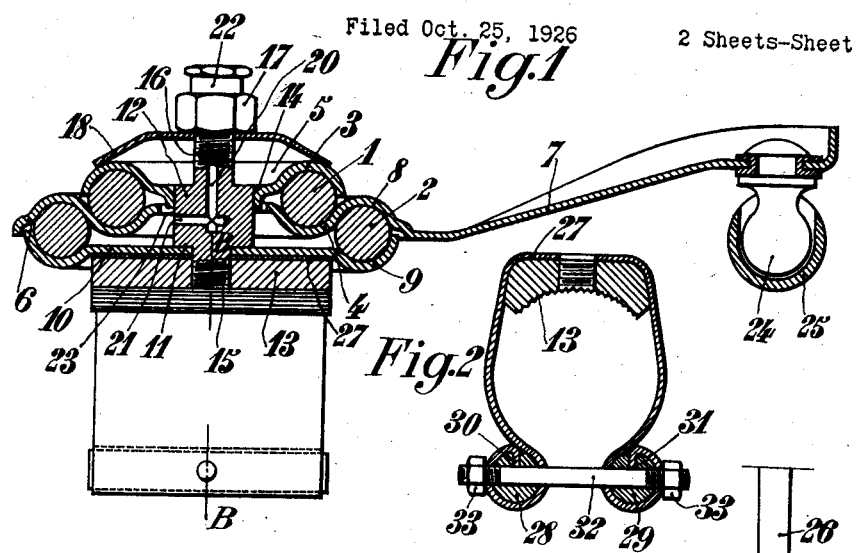
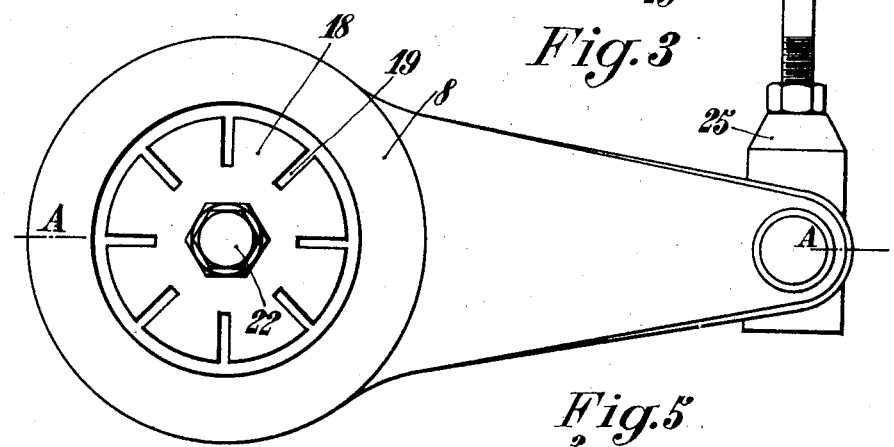
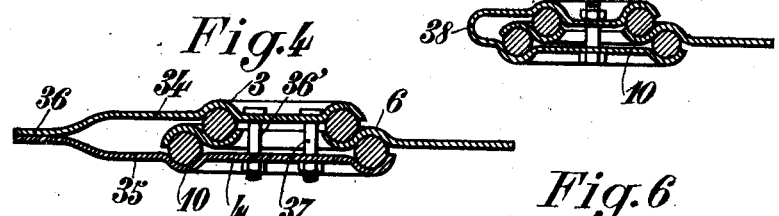
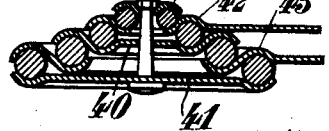

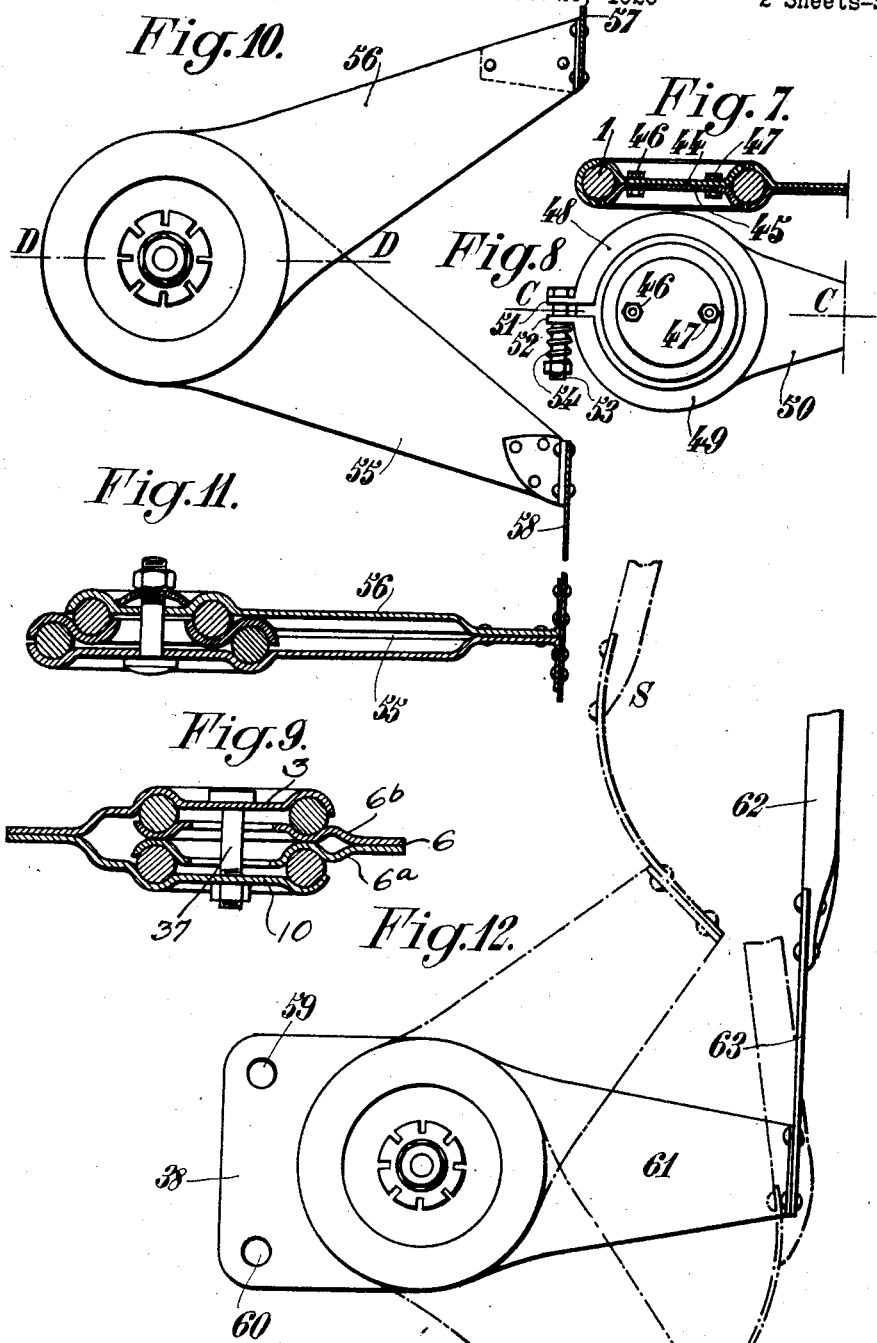

Patented Feb. 26, 1929.

1,703,264

UNITED STATES PATENT OFFICE.

JACQUES TOURNADOUR D'ALBAY, OF PARIS, FRANCE, ASSIGNOR TO SOCIETE ANONYME: ESTABLISSEMENTS MAURICE HOUDAILLE, OF LEVALLOIS-PERRET, SEINE, FRANCE, A COMPANY OF FRANCE.

FRICTION SHOCK ABSORBER.

Application filed October 25, 1926, Serial No. 144,118, and in France November 3, 1925.

The present invention has for its object improvements in friction shock absorbers. These improvements have for main objects to simplify the construction of these apparatus, to increase their efficiency and to avoid the use of any axis of rotation subjected to an important wear.

These improvements are mainly characterized in that the friction members are constituted by tori, preferably of circular cross section, but which can also have a cross section of another shape, these tori being clamped between cheeks provided with suitable grooves wherein they fit, the said cheeks being subjected to relative angular displacements when relative oscillations of the frame and axles take place.

In this way, the apparatus can be realized in an extremely simple manner; on the other hand, for an equal cumbersomeness, the friction surfaces are more extended, this reducing the wear; finally, the tori arranged in the grooves of the cheeks automatically ensure the relative centering of the various cheeks and consequently the screw threaded rod which allows an adjustable clamping action need not be used any longer as axis of rotation.

The accompanying drawing illustrates, by way of example only, several forms of construction of the invention.

Figs. 1, 2 and 3 relate to a first form of construction; Fig. 1 is a sectional elevation according to line A—A of Fig. 3; Fig. 2 is a partial sectional side view according to line B—B of Fig. 1; Fig. 3 is a plan view corresponding to Fig. 1.

Fig. 4 is a diagrammatic sectional elevation of a second form of construction.

Fig. 5 is a diagrammatic sectional elevation of a third form of construction.

Fig. 6 is a diagrammatic sectional elevation of a fourth form of construction.

Figs. 7 and 8 relate to a fifth form of construction; Fig. 7 is a sectional elevation according to line C—C of Fig. 8; Fig. 8 is a plan view corresponding to Fig. 7.

Fig. 9 is a diagrammatic sectional elevation of a sixth form of construction.

Figs. 10, 11 relate to a modification of the form of construction illustrated in Fig. 4; Fig. 10 is an elevation; Fig. 11 is a corresponding sectional plan view according to line D—D of Fig. 10.

Fig. 12 relates to a modification of the assemblage.

In the form of execution illustrated in Fig. 1, the friction surfaces are constituted by two tori 1 and 2, of circular cross section. The torus 1 is clamped between the grooves 3 and 4, of suitable cross section, respectively provided in a cheek 5 and in a plate 6 rigid with the lever arm 7. The torus 2 is clamped between the grooves 8 and 9, of suitable cross section, respectively provided in the plate 6 and in a cheek 10. The cheeks 3 and 10 are rendered angularly rigid together. In fact, in this example, the cheek 10 is clamped between the shoulder 11 of a rod 12, of prismatic cross section, and a plate member 13, whilst the cheek 5 is perforated with a hole 14, the cross section of which corresponds to that of the prismatic rod 12. This prismatic rod extends on one side in a screw threaded stem 15 fitting in a corresponding threaded hole of the plate member 13, so as to ensure the clamping and securing in position of the cheek 10. On the other hand, the prismatic rod 12 extends on the other side in another screw threaded stem 16 which, in combination with the nut 17, allows to exert, through the medium of a resilient washer 18, an adjustable clamping stress on the cheek 5. The cheek 5 and cheek 10 are rendered angularly rigid together by the prismatic shape of the rod 12, but this angular fixing can be effected in any other suitable manner. The pressure exerted through the medium of the resilient washer 18 on the cheek 5 is obviously transmitted to the torus 1, plate 6 and torus 2. Preferably, as illustrated, the torus 1 has a radius of revolution smaller than that of the torus 2, so that the portion of the plate 6 constituting the groove 4 can resiliently yield. This arrangement, if desired, might allow to dispense with the resilient washer 18; in this case, the resilient reaction would be produced by the portion of the plate 6 constituting the groove 4; the said portion might be radially slotted for increasing its resiliency, in the same way as shown for instance at 19 for the resilient washer 18.

The rod 12 and its screw threaded extension 16 are perforated with an axial hole 20 and a radial hole 21; the hole 20 is threaded at its upper end for receiving a lubricating plug 22 which will permit of ensuring the lubrication under pressure of the apparatus illustrated. It is to be noted that the plate 6 is perforated at 23 with a hole the diameter of which is notably greater than the dimensions of the prismatic rod 12, so that this plate 6 can freely rotate and, the rod 12 does not constitute in any way an axis of rotation. The relative centering of the cheek 10, of the plate 6 and of the cheek 5 is automatically obtained by the placing in position of the tori 1 and 2.

The lever arm 7 is terminated by a ball member 24 enclosed in a ball casing 25 connected to the chassis by a screw threaded rod 26 and a resilient blade (not shown) terminating this rod 26. The plate member 13 is, on the contrary, connected to the axle, supposed to be a tubular axle, and preferably in the following manner: between the cheek 10 and the plate member 13 is clamped a sheet-iron strip 27 having preferably the shape shown in Fig. 2, so as to resiliently fit on the axle. At its ends, the strip 27 is wound on rods 28 and 29 and stopped at 30 and 31 by penetration of the ends of the said strip in corresponding notches of the rods 28 and 29. These rods, as well as the portion of the sheet-iron strip 27 which surrounds them, are perforated with holes, the number of which can vary according to circumstances, these holes permitting the passage of bolts such as 32, which, by means of nuts 33, permit an energetic clamping of the sheet-iron strip 27 and, consequently, of the plate member 13, on the axle. For avoiding any sliding movement the plate member 13 is preferably striated on its inner face as shown in Fig. 2.

The example of Figs. 1 to 3 relates to a shock absorber the body of which is rigid with the axle; but it is obvious that the body might be secured on the chassis and, in this case, the ball 24 might be connected to the axle by the ball casing 25, rod 26 and a resilient blade terminating this rod. It is also obvious that the same apparatus can be provided with two lever arms jointed as the legs of compasses, one of these lever arms being connected to the chassis and the other to the axle. Such a form of construction is illustrated for instance in Fig. 4. In this figure, it will be seen that the cheeks 3 and 10 are rigid with two lever arms 34 and 35 which are rendered rigid together at 36. In accordance with the previous explanations, concerning the resiliency of the portion 4 of the plate 6, the form of construction illustrated in Fig. 4 does not comprise the use of resilient washers such as 18 in Fig. 1; moreover, the clamping of the cheeks 3 and 10 is ensured by several bolts 36' and 37. In practice, a single bolt might be sufficient, but this arrangement has been illustrated in order to clearly show that the single bolt used in practice, does not play in any way the part of pivoting axis.

In the example of Fig. 5, which is similar to that of Fig. 4, the cheeks 3 and 10 are made in one piece and are thus connected by a strip or tongue 38, folded as illustrated. This part 38 can be used, if desired, for securing the shock absorber on the car, as will be explained later on with reference to Fig. 12.

It is possible to obtain more powerful apparatus, either by increasing the diameter of the tori, or by increasing the diameter of their cross section, or by combining, instead of two tori, a greater number of tori, as illustrated for instance in Fig. 6. In this figure, the cheeks 39, 40 and 41 are angularly rigid with each other, as is the case for the cheeks 3 and 10 in the previously mentioned examples. On the other hand, the plates 42 and 43 are also rigid together and movable relatively to the cheeks 39, 40 and 41 upon relative displacements of the frame and of the axle. In this example, the resiliency of the cheeks 39 and 40 and plates 42 and 43 are also used.

In the example of Figs. 7 and 8, a friction surface constituted by a torus is still used, in accordance with the general feature of the invention; but instead of ensuring the pressure between the various cheeks parallel to their geometrical axis of relative rotation, the pressure is exerted in this case at right angles to the said axis. In this example, the torus 1 is arranged in a groove formed by the assemblage of the two cheeks 44 and 45 secured one on the other for instance by means of bolts 46 and 47. The torus 1 is then surrounded by the circular groove formed by the two branches 48 and 49, sufficiently resilient and rigid with the lever 50. The two branches 48 and 49 are terminated by flanges 51 and 52 which permit the clamping by means of the bolt 53 and through the medium of the spring 54, by means of which the pressure exerted on the friction torus 1 can be conveniently and resiliently adjusted. It is obvious that the torus might also be locked through its outer surface, the inner pulley having a certain extensibility for causing the braking power to vary according to circumstances. It is also possible to increase the power of the apparatus by coupling per pair cheeks of similar profile, but arranged in opposite direction.

In all cases, the cheeks must take to the maximum the shape of the profile of the tori, so as to increase as much as possible the surfaces in contact. In this way, for one and the same friction stress, the unitary pressure on the surfaces in contact is diminished and, consequently, the wear is also diminished in the same proportion.

In the example of Fig. 9 the central plate 6 is formed by two members, 6$^a$ and 6$^b$ which are fixed together, each of these plates or members forming a groove of the same diameter. The outer plates 3 and 10 are formed as shown in the embodiment of Fig. 4, but, well understood, the grooves which they show are of the same diameter. A single bolt 37 locks the two outer plates together.

In the example of Figs. 10 and 11, the levers 55 and 56 of the shock absorber having branches jointed as those of compasses, are simply connected by resilient blades 57 and 58 to the chassis. This arrangement avoids the use of joints and diminishes the cost price of the apparatus. In the example of Fig. 12, which is similar to that of Fig. 5, the curved lug 38 which renders the cheeks 3 and 10 rigid together, serves for securing the apparatus to the chassis by means of bolts passing through the holes 59 and 60. In the same manner as in Figs. 10 and 11 the lever 61 is connected to the coupling link 62 by a resilient blade 63. The outline in dotted lines shows at S the upper limit position, and at I the lower limit position.

It is to be understood that, besides the forms of construction described by way of example only, a large number of other modifications can be devised; these modifications, which all present the general feature of the invention, mainly residing in the use of toric friction surfaces, are, of course, included in the scope of the invention.

What I claim as my invention and desire to secure by Letters Patent is:

1. In a frictional shock absorber, a plate provided with grooves on opposite sides, annular frictional bodies arranged on both sides of the plate and positioned in the grooves therein, and other plates provided with grooves in which are received the annular bodies.

2. In a shock absorber, a plate provided with grooves on opposite sides, ring shaped frictional members of circular cross sections arranged on both sides of the plate and positioned in the grooves, and other plates provided with grooves in which are also arranged the annular bodies.

3. In a frictional shock absorber, a plate having annular grooves in its opposite faces, friction rings of circular cross section arranged on opposite sides of the plate and positioned in the grooves, other plates arranged adjacent the rings and also provided with annular grooves for receiving the rings, and means for fixing the last mentioned plates.

4. In a frictional shock absorber, a plate provided on opposite sides with ring receiving grooves of different diameters, rings of different diameters arranged on opposite sides of the plate and positioned in the corresponding grooves, and plates provided with grooves which fit the rings.

5. In a frictional shock absorber, a plate provided on opposite sides with annular grooves of different diameters, friction rings of circular cross section arranged on opposite sides of the plates and being of different diameters and positioned in the corresponding grooves, outer plates provided with grooves for fitting the rings, and means for fixing the outer plates.

6. In a frictional shock absorber, a resilient plate provided with ring receiving grooves, friction rings positioned on opposite sides of the plate and arranged in the grooves, resilient plates provided with grooves fitting the ring, and means for applying the resilient pressure of the plates on the rings.

7. A frictional shock absorber, a resilient plate provided on the opposite sides with ring receiving grooves of different diameters, friction rings of different diameters arranged on opposite sides of the plate and positioned in the grooves, the difference of diameter between the rings being sufficient to elastically flex the plates on which they are arranged, other plates provided with grooves fitted on the ring, and means for applying pressure on the last mentioned plates.

8. In a frictional shock absorber, a plate provided with ring receiving grooves, friction rings disposed on opposite sides of the plate and positioned in the grooves, outer plates provided with grooves fitted on the rings, a bolt traversing the plates, and an elastic ring locked by said bolt against one of the outer plates.

9. In a friction shock absorber, a plurality of plates provided with annular grooves on opposite sides of different diameters, rings arranged on opposite sides of the plates and positioned in the corresponding grooves, the difference of diameter between the rings being sufficient in order to elastically flex the plates on which they rest, outer plates provided with grooves fitting the outer rings, a bolt passing through all of the plates, and an elastic washer locked by said bolt against one of the outer plates.

10. A frictional shock absorber, a plurality of plates provided on opposite sides with annular ring receiving grooves of different diameters, friction rings of different diameters arranged on opposite sides of the plates and positioned in the corresponding grooves, the differences of diameters being sufficient to elastically flex the plates on which they rest, outer plates provided with grooves for partially receiving outer rings, means for fixing the outer plates and certain of the intermediate plates together, and means for fixing the remaining intermediate plates together.

11. In a frictional shock absorber, a plurality of plates provided on opposite sides with grooves of different diameters, friction rings of different diameters arranged on opposite sides of the plate positioned in the corresponding grooves, the differences of diameter between the rings being sufficient in order to elastically flex the plates on which the rings rest, other plates provided with grooves and fitting the outer rings, a bolt with a polygonal cross section terminating in a screw threaded portion, and the polygonal cross section of the bolts being anchored in the outer plates and in certain of the intermediate plates and freely passed through the remaining intermediate plates.

In testimony whereof I have signed my name to this specification.

JACQUES TOURNADOUR D'ALBAY.